United States Patent
Park et al.

(10) Patent No.: US 8,125,147 B2
(45) Date of Patent: Feb. 28, 2012

(54) PLASMA DISPLAY DEVICE WITH LIGHT-ABSORBING FILTER

(75) Inventors: Yu Park, Gumi-si (KR); Tae Deok Seo, Gumi-si (KR); Jun Hwan Ju, Gumi-si (KR); Hun Gun Park, Gumi-si (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 12/162,312

(22) PCT Filed: Sep. 28, 2006

(86) PCT No.: PCT/KR2006/003907
§ 371 (c)(1),
(2), (4) Date: Nov. 10, 2008

(87) PCT Pub. No.: WO2008/010624
PCT Pub. Date: Jan. 24, 2008

(65) Prior Publication Data
US 2009/0167173 A1    Jul. 2, 2009

(30) Foreign Application Priority Data

| Jul. 19, 2006 | (KR) | 10-2006-0067532 |
| Jul. 25, 2006 | (KR) | 10-2006-0069775 |
| Sep. 8, 2006 | (KR) | 10-2006-0086840 |
| Sep. 25, 2006 | (KR) | 10-2006-0093119 |

(51) Int. Cl.
*H01J 17/49* (2006.01)
*H01J 17/00* (2006.01)
*G02B 5/22* (2006.01)

(52) U.S. Cl. ......... 313/582; 313/567; 313/587; 359/885

(58) Field of Classification Search ............... None
See application file for complete search history.

(56) References Cited

U.S. PATENT DOCUMENTS

| 6,399,879 | B1 * | 6/2002 | Ueda et al. | 174/389 |
| 7,271,955 | B2 * | 9/2007 | Osawa et al. | 359/453 |
| 7,679,275 | B2 * | 3/2010 | Park et al. | 313/112 |
| 7,791,257 | B2 * | 9/2010 | Hirata et al. | 313/110 |
| 7,812,539 | B2 * | 10/2010 | Cha et al. | 313/587 |
| 7,816,844 | B2 * | 10/2010 | Cha et al. | 313/112 |
| 7,852,002 | B2 * | 12/2010 | Cha et al. | 313/582 |
| 2005/0237611 | A1 | 10/2005 | Osawa et al. | 359/460 |
| 2006/0145578 | A1 * | 7/2006 | Park et al. | 313/112 |
| 2007/0075641 | A1 * | 4/2007 | Yu | 313/587 |

FOREIGN PATENT DOCUMENTS

| EP | 0 998 182 A2 | 5/2000 |
| JP | 2000-325608 | 12/2000 |
| JP | 2001-034183 | 2/2001 |
| JP | 2004-286996 | 10/2004 |
| KR | 10-0579713 B1 | 5/2006 |

OTHER PUBLICATIONS

European Search Report dated Oct. 28, 2010 issued in Application No. 06 79 8990.

* cited by examiner

Primary Examiner — Natalie Walford
(74) Attorney, Agent, or Firm — Ked & Associates LLP

(57) ABSTRACT

In a plasma display apparatus of the preset invention, a filter including an external light shielding sheet configured to shield externally incident light to the greatest extent possible is disposed at the front, thus effectively implementing a black image and improving the bright and dark room contrast. Furthermore, since the external light shielding sheet and an EMI shielding sheet are formed to be aligned, thereby sustaining the luminance of the screen.

37 Claims, 12 Drawing Sheets

PLASMA DISPLAY DEVICE WITH LIGHT-ABSORBING FILTER

TECHNICAL FIELD

The present invention relates, in general, to a plasma display apparatus, and more particularly, to a plasma display apparatus in which an external light shielding sheet is disposed at the front in order to shield external light incident from the outside of a panel, thereby improving the bright and dark room contrast of the panel and sustaining the luminance of the panel.

BACKGROUND ART

In general, a Plasma Display Panel (hereinafter, referred to as a "PDP") is an apparatus configured to generate a discharge by applying voltage to electrodes disposed in discharge spaces and to display an image including characters and/or graphics by exciting phosphors with plasma generated during the discharge of gas. The PDP is advantageous in that it can be made large, light and thin, can provide a wide viewing angle in all directions, and can implement full colors and high luminance.

In the PDP constructed above, when a black image is implemented, external light is reflected from the front of the panel due to white-based phosphor exposed to the lower plate of the panel. Therefore, a problem arises because a black image is recognized as a bright-based dark color, resulting in a lowered contract.

DISCLOSURE

Technical Problem

The present invention has been developed in an effort to provide a plasma display apparatus having the advantages of preventing the reflection of light by effectively shielding external light incident on a panel, and improving the bright and dark room contrast and luminance of a PDP.

Technical Solution

To accomplish the above object, a plasma display apparatus according to an embodiment of the present invention includes a PDP; and an external light shielding sheet and an EMI shielding sheet disposed at the front of the PDP and configured to absorb external light incident on the PDP. The external light shielding sheet includes a first base unit, and a plurality of first pattern units formed on the first base unit and having a refractive index lower than that of the first base unit. The EMI shielding sheet includes a second base unit, and a plurality of second pattern units formed on the second base unit. A width of the first pattern unit is 1.2 to 3.5 times greater than that of the second pattern unit.

It is preferred that the width of the second pattern unit be set in the range of 10 to 30 μm, and the shortest distance between neighboring second pattern units be set in the range of 250 to 300 μm. A black oxidization process is performed on a bottom of the second pattern unit.

The width of the first pattern unit may be 1.5 to 2.3 times greater than that of the second pattern unit. The shortest distance between neighboring second pattern units may be 4 to 7 times greater than the shortest distance between neighboring first pattern units.

A plasma display filter according to an embodiment of the present invention includes an external light shielding sheet and an EMI shielding sheet. The external light shielding sheet includes a first base unit, and a plurality of first pattern units formed on the first base unit and having a refractive index lower than that of the first base unit. The EMI shielding sheet includes a second base unit, and a plurality of second pattern units formed on the second base unit. A width of the first pattern unit is 1.2 to 3.5 times greater than that of the second pattern unit.

Advantageous Effects

In the plasma display apparatus according to the present invention, a filter including an external light shielding sheet configured to absorb and shield externally incident light to the greatest extent possible is disposed at the front of a panel. It is therefore possible to effectively implement a black image and improve the bright and dark room contrast. Furthermore, the external light shielding sheet and an EMI shielding sheet are formed so that they are aligned with each other, thereby sustaining the luminance of the screen.

BEST MODE

A plasma display apparatus according to the present invention will now be described in detail in connection with specific embodiments with reference to the accompanying drawings.

It is to be understood that the plasma display apparatus of the present invention is not limited to the embodiments, but may include a variety of embodiments.

The embodiments of the present invention will be described below with reference to the accompanying drawings.

Figure 1:
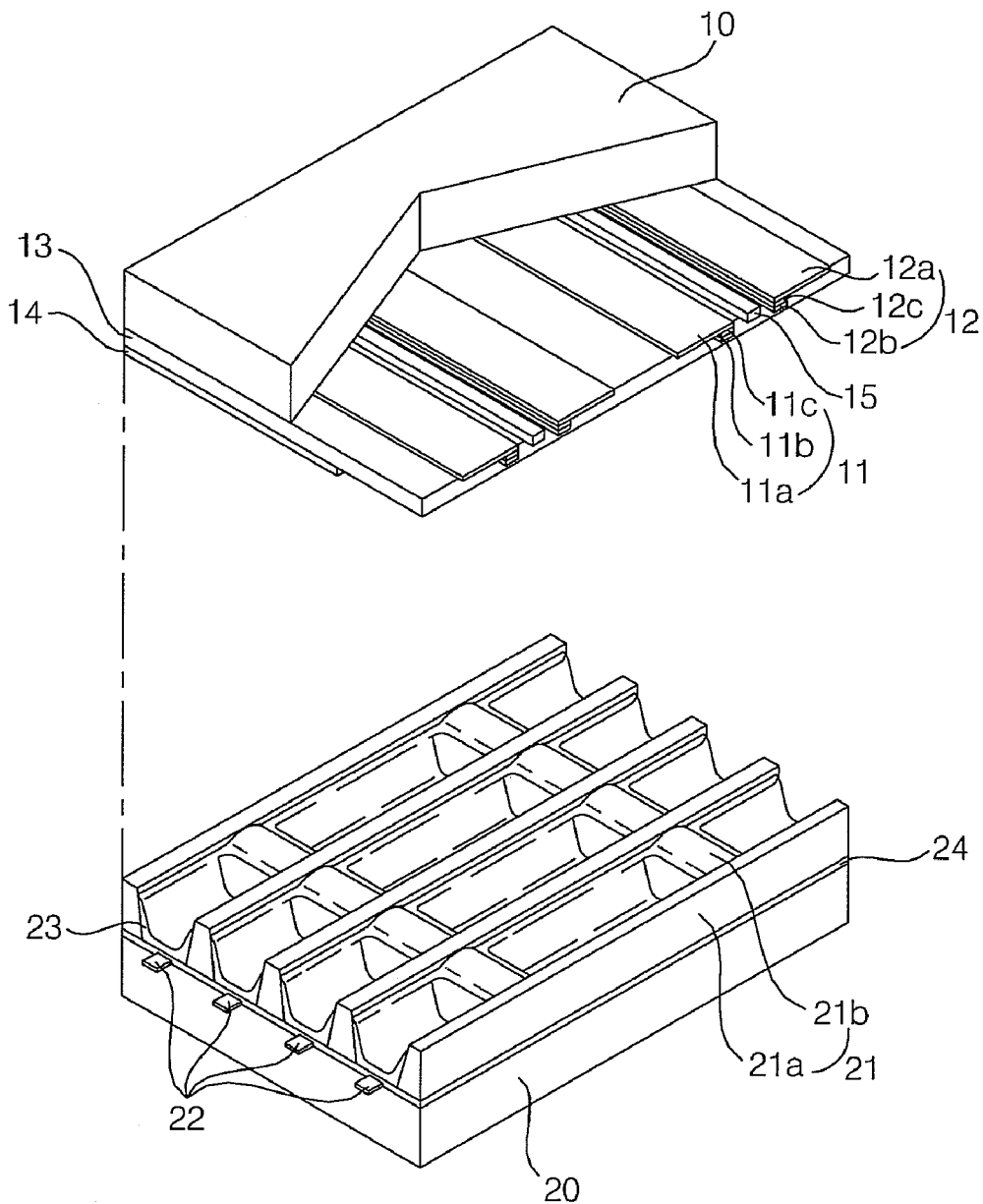
FIG. 1 is a perspective view illustrating an embodiment of the construction of a PDP according to an embodiment of the present invention.

FIG. 1 is a perspective view illustrating an embodiment of the construction of a PDP according to the present invention.

Referring to FIG. 1, the PDP includes a scan electrode 11 and a sustain electrode 12 (i.e., a sustain electrode pair) both of which are formed on a front substrate 10, and address electrodes 22 formed on a rear substrate 20.

The sustain electrode pair 11 and 12 includes transparent electrodes 11a and 12a, and bus electrodes 11b and 12b. The transparent electrodes 11a and 12a are generally formed of Indium-Tin-Oxide (ITO). The bus electrodes 11b and 12b may be formed using metal, such as silver (Ag) or chrome (Cr), a stack of Cr/copper (Cu)/Cr, or a stack of Cr/aluminum (Al)/Cr. The bus electrodes 11b and 12b are formed on the transparent electrodes 11a and 12a and serve to reduce a voltage drop caused by the transparent electrodes 11a and 12a having a high resistance.

Meanwhile, according to an embodiment of the present invention, the sustain electrode pair 11 and 12 may have a structure in which the transparent electrodes 11a and 12a and the bus electrodes 11b and 12b are laminated, or include only the bus electrodes 11b and 12b without the transparent electrodes 11a and 12a. Such a structure is advantageous in that it can save the manufacturing cost of the panel because it does not require the transparent electrodes 11a and 12a. The bus electrodes 11b and 12b used in the structure may also be formed using a variety of materials, such as a photosensitive material, other than the above-mentioned materials.

Black matrices (BM) 15 are arranged between the transparent electrodes 11a and 12a and the bus electrodes 11b and 12b of the scan electrode 11 and the sustain electrode 12. The black matrices 15 has a light-shielding function of reducing the reflection of external light generated outside the front substrate 10 by absorbing the external light and a function of improving the purity and contrast of the front substrate 10.

The black matrices 15 according to an embodiment of the present invention are formed in the front substrate 10. Each of the black matrices 15 may include a first black matrix 15 formed at a location at which it is overlapped with a barrier rib 21, and second black matrices 11c and 12c formed between the transparent electrodes 11a and 12a and the bus electrodes 11b and 12b. The first black matrix 15, and the second black matrices 11c and 12c, which are also referred to as a "black layer" or a "black electrode layer", may be formed at the same time and be connected physically, or may be formed separately and not be connected physically.

In the case where the first black matrix 15 and the second black matrices 11c and 12c are connected to each other physically, the first black matrix 15 and the second black matrices 11c and 12c may be formed using the same material. However, in the event that the first black matrix 15 and the second black matrices 11c and 12c are not connected to each other physically, the first black matrix 15 and the second black matrices 11c and 12c may be formed using different materials.

An upper dielectric layer 13 and a protection layer 14 are laminated on the front substrate 10 in which the scan electrodes 11 and the sustain electrodes 12 are formed. Charged particles from which plasma is generated are accumulated on the upper dielectric layer 13. The protection layer 14 serves to protect the upper dielectric layer 13 from sputtering of charged particles generated during the discharge of a gas and also to increase emission efficiency of secondary electrons.

The address electrodes 22 are formed in such a way to cross the scan electrodes 11 and the sustain electrodes 12. Lower dielectric layers 24 and barrier ribs 21 are also formed on the rear substrate 20 in which the address electrodes 22 are formed.

A phosphor layer 23 is coated on the lower dielectric layers 24 and the surfaces of the barrier ribs 21. Each of the barrier ribs 21 includes a longitudinal barrier rib 21a formed parallel to the address electrodes 22 and a traverse barrier rib 21b formed to cross the address electrodes 22. The barrier ribs 21 separate discharge cells physically, and can prevent ultraviolet rays generated by a discharge and a visible ray from leaking to neighboring discharge cells.

An embodiment of the present invention may include not only the structure of the barrier ribs 21 illustrated in FIG. 1, but also the structure of barrier ribs having a variety of shapes. For example, an embodiment of the present invention may include a differential type barrier rib structure in which the longitudinal barrier rib 21a and the traverse barrier rib 21b have different height, a channel type barrier rib structure in which a channel that can be used as an exhaust passage is formed in at least one of the longitudinal barrier rib 21a and the traverse barrier rib 21b, a hollow type barrier rib structure in which a hollow is formed in at least one of the longitudinal barrier rib 21a and the traverse barrier rib 21b.

In the differential type barrier rib structure, it is preferred that the traverse barrier rib 21b have a height higher than that of the longitudinal barrier rib 21a. In the channel type barrier rib structure or the hollow type barrier rib structure, it is preferred that a channel or a hollow be formed in the traverse barrier rib 21b.

Meanwhile, in the present embodiment, it has been described that the red (R), green (G), and blue (B) discharge cells are arranged on the same line. However, the R, G, and B discharge cells may be arranged in different forms. For example, the R, G, and B discharge cells may have a delta type arrangement in which they are arranged in a triangle. Furthermore, the discharge cells may be arranged in a variety of forms, such as square, pentagon and hexagon.

Figure 2:
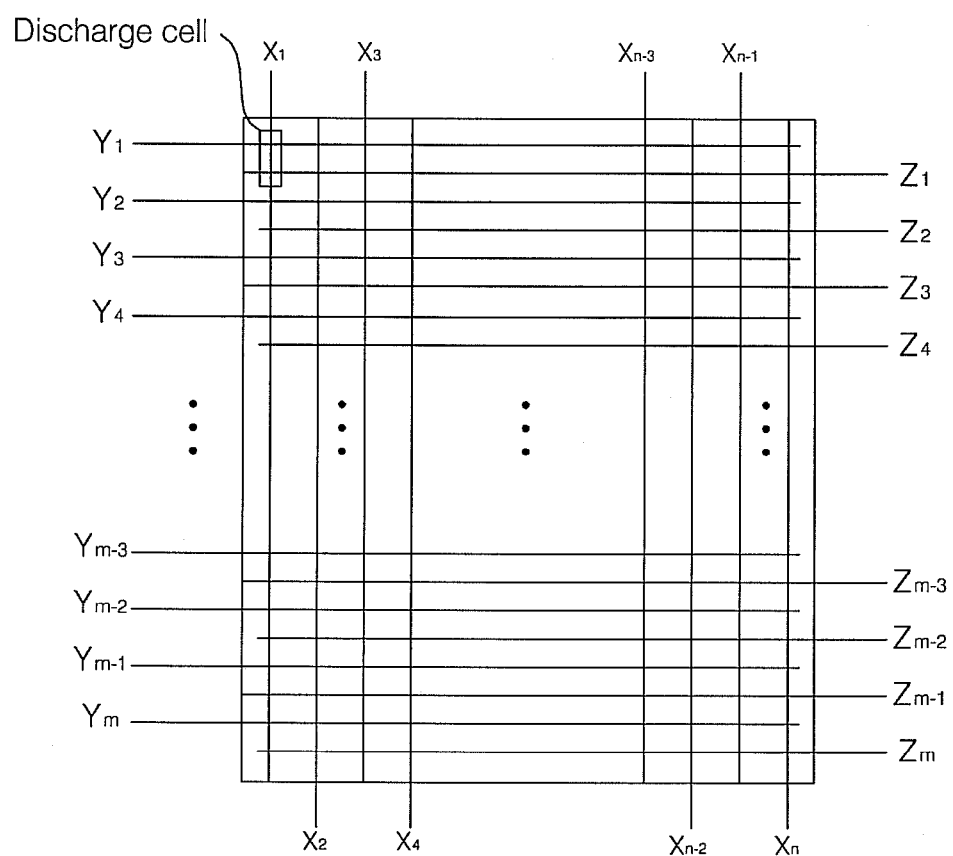
FIG. 2 is a view illustrating an embodiment of electrode arrangements of the PDP.

FIG. 2 is a view illustrating an embodiment of electrode arrangements of the PDP.

Referring to FIG. 2, a plurality of discharge cells constituting the PDP are preferably arranged in matrix form. The plurality of discharge cells are respectively disposed at the intersections of scan electrode lines Y1 to Ym, sustain electrodes lines Z1 to Zm, and address electrodes lines X1 to Xn. The scan electrode lines Y1 to Ym may be driven sequentially or simultaneously. The sustain electrode lines Z1 to Zm may be driven at the same time. The address electrode lines X1 to Xn may be driven with them being divided into even-numbered lines and odd-numbered lines, or may be driven sequentially.

The electrode arrangement shown in FIG. 2 is only an embodiment of the electrode arrangements of the PDP according to an embodiment of the present invention. Thus, the present invention is not limited to the electrode arrangements and the driving method of the PDP, as illustrated in FIG. 2. For example, the present invention may be applied to a dual scan method in which two of the scan electrode lines Y1 to Ym are driven at the same time. Furthermore, the address electrode lines X1 to Xn may be driven with them being divided into upper and lower parts on the basis of the center of the panel.

Figure 3:
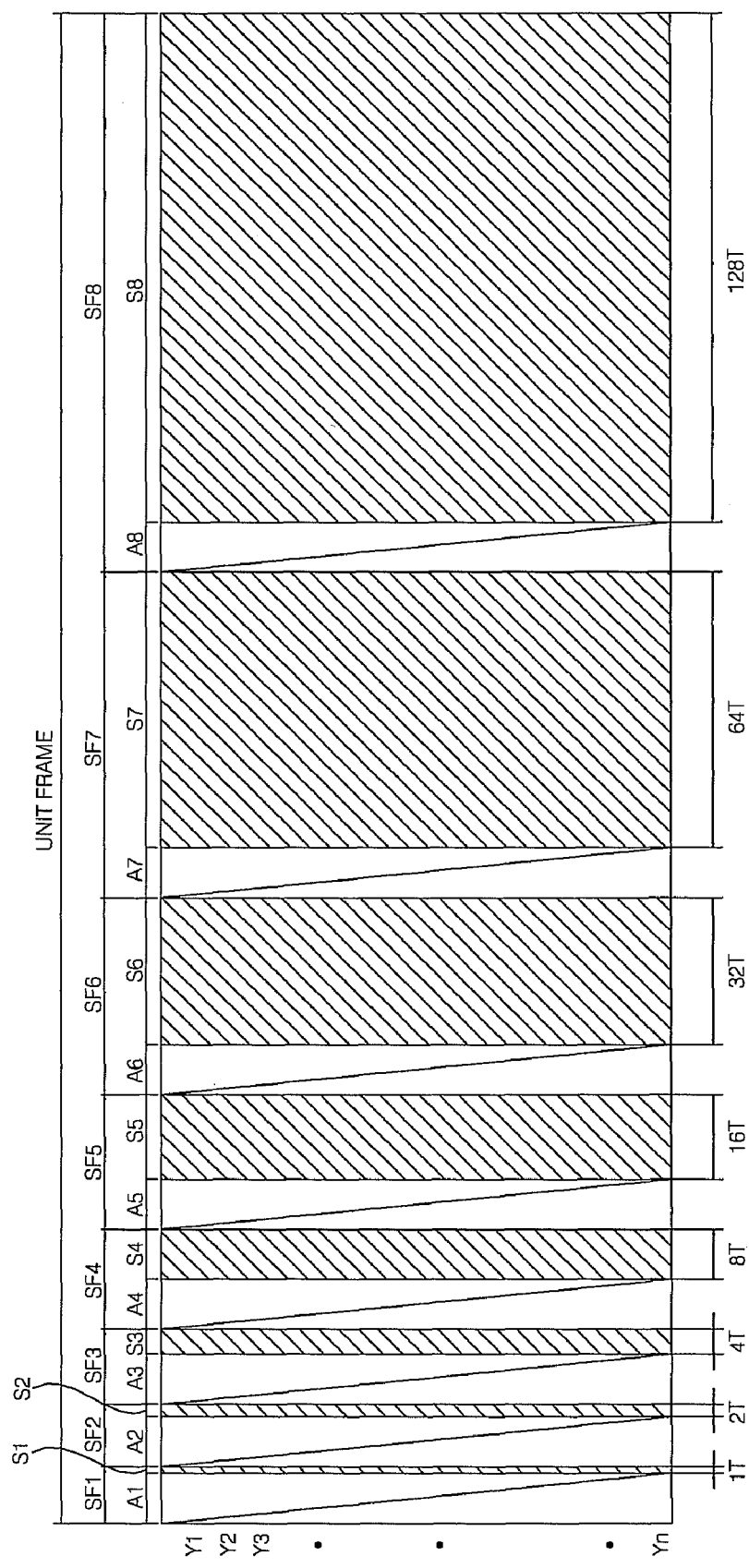
FIG. 3 is a timing diagram showing an embodiment of a method of driving a plasma display apparatus with one frame of an image being time-divided into a plurality of subfields.

FIG. 3 is a timing diagram illustrating an embodiment of a method of driving the plasma display apparatus with one frame of an image being time-divided into a plurality of subfields.

Referring to FIG. 3, a unit frame may be divided into a specific number (for example, eight subfields SF1, ..., SF8) in order to represent gray levels of an image. Each of the subfields SF1, ..., SF8 is divided into a reset period (not shown), address periods A1, ..., A8, and sustain periods S1, ..., S8.

In each of the address periods A1, ..., A8, data signals are applied to the address electrodes X, and scan pulses corresponding to the data signals are sequentially applied to the scan electrodes Y. In each of the sustain periods S1, ..., S8, sustain pulses are alternately applied to the scan electrodes Y and the sustain electrodes Z, thereby generating a sustain discharge in discharge cells selected in the address periods A1, ..., A8.

The luminance of the PDP is proportional to the number of sustain discharge pulses within the sustain periods S1, ..., S8 occupied in the unit frame. In the case where one frame forming 1 image is represented by eight subfields and 256 gray levels, a different number of sustain pulses may be sequentially allocated to the respective subfields in the ratio of 1, 2, 4, 8, 16, 32, 64, and 128. For example, in order to obtain the luminance of 133 gray levels, a sustain discharge can be generated by addressing cells during the subfield1 period, the subfield3 period, and the subfield8 period.

Meanwhile, the number of sustain discharges allocated to each subfield may be changed variably depending on the weights of subfields. That is, a case where one frame is divided into eight subfields has been described with reference to FIG. 3. However, the present invention is not limited to the above example, but the number of subfields, forming one frame, may be changed in various ways depending on the design specifications. For example, the PDP can be driven by dividing one frame into eight or more subfields, such as 12 or 16 subfields.

Figure 4:
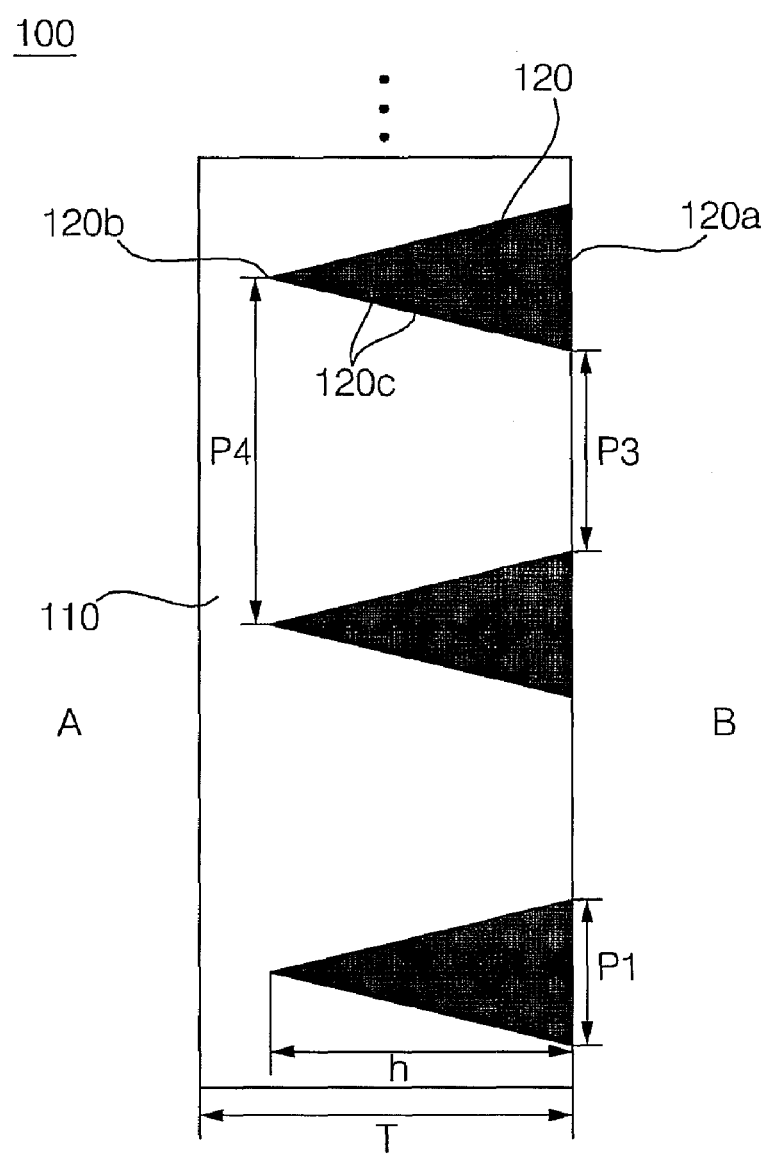
FIGS. 4 to 6 are views illustrating the construction of an external light shielding sheet provided in a filter according to the present invention.
Figure 5:
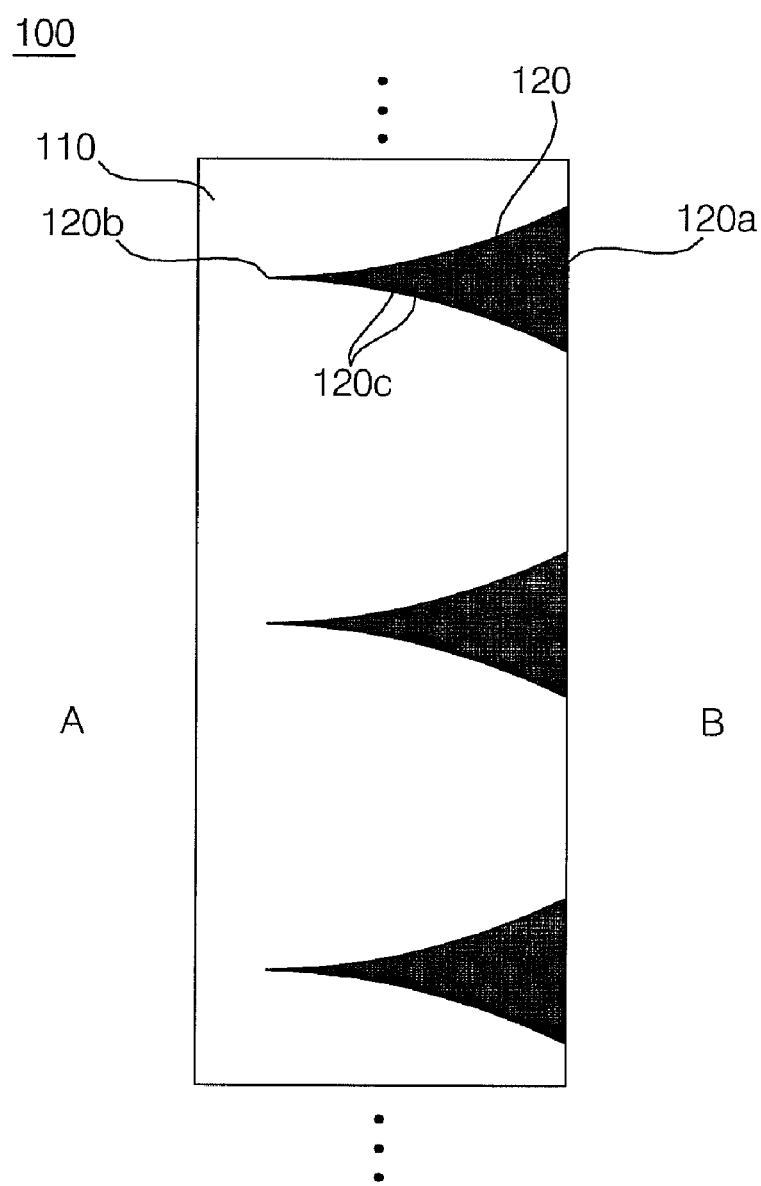
Figure 6:
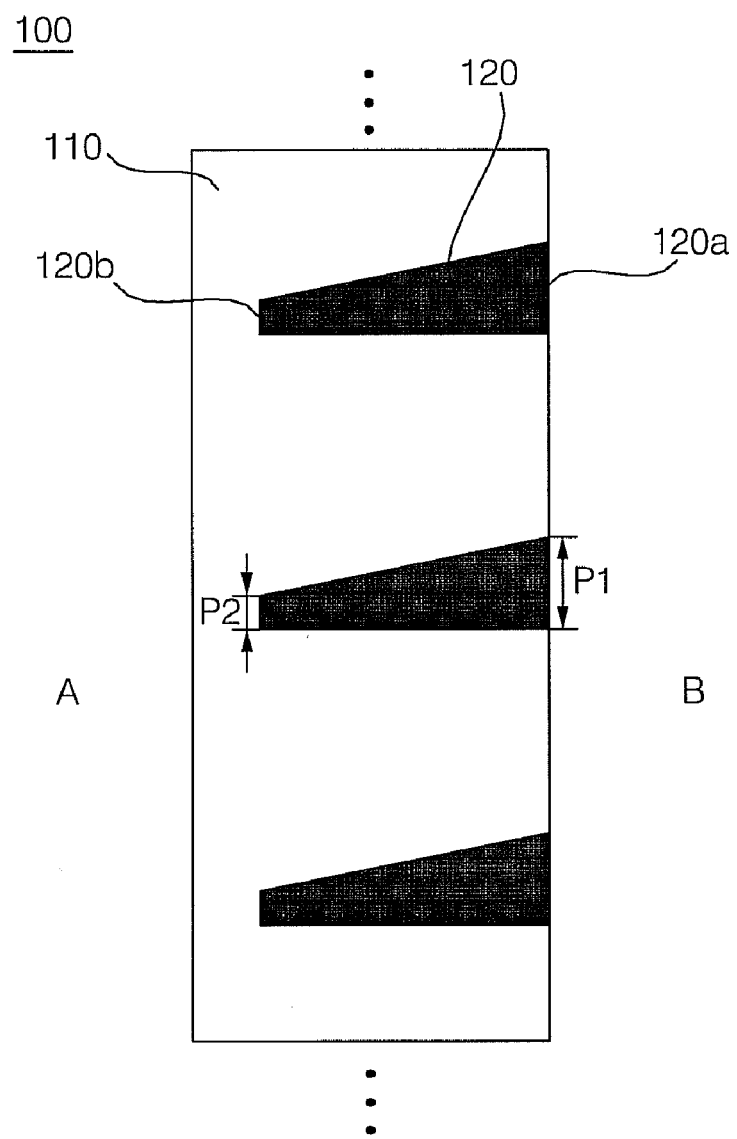

FIGS. 4 to 6 are views illustrating the construction of an external light shielding sheet provided in a filter according to the present invention. The external light shielding sheet 100 includes a base unit 110 and pattern units 120.

The base unit 110 may be formed using a transparent plastic material (for example, a resin-based material formed by a UV-hardening method) so that it allows light to pass therethrough. In order to increase the effect of protecting the front of the panel, the base unit 110 may be formed using a robust glass material.

Referring to FIG. 4, each of the pattern unit 120 of the external light shielding sheet 100 may have a triangle, more preferably, an isosceles triangle. The pattern unit 120 is formed of a dark-based material compared with the base unit 110. For example, the pattern units 120 may be formed using a carbon-based material, or the outer surface of the pattern unit 120 may be coated with dark dyes in order to increase the effect of absorbing external light.

In FIGS. 4 to 6, it is preferred that a bottom 120a of the pattern unit included in the external light shielding sheet 100 be disposed on a panel side B, and a top 120b of the pattern unit included in the external light shielding sheet 100 be disposed on a viewer side A to which external light is incident. An external light source is generally located over the panel and, therefore, the external light will be incident on the panel with inclination from the upper side of the panel.

In order to absorb and shield the external light and totally reflect a visible ray emitted from the panel, thus increasing the reflectance of the panel light, it is preferred that the refractive index of the pattern unit 120 (that is, the refractive index of an inclined surface (that is, at least a part of the pattern unit 120) be lower than that of the base unit 110. In order to maximize the absorption of external light and the total reflection of panel light considering the angle of the external light incident on the panel, it is preferred that the refractive index of the pattern unit 120 be 0.300 to 0.999 times greater than that of the base unit 110.

When the thickness T of the external light shielding sheet 100 ranges from 20 to 250 μm, the manufacturing process becomes convenient, and an adequate optical transmittance for allowing a visible ray to be easily transmitted can be obtained. The thickness T of the external light shielding sheet may be set in the range of 100 to 180 μm so that light emitted from the panel smoothly transmits through the external light shielding sheet, externally incident light is refracted and effectively absorbed and blocked by the pattern units 120, and the robustness of the sheet can be obtained.

Furthermore, the pattern unit 120 may have a bottom width P1 of 18 to 35 μm. Thus, the aperture ratio for allowing light, generated from the panel, to be smoothly radiated to the viewer side A can be obtained, and external light can be blocked to the greatest extent possible. In this case, a bottom 120a of the pattern unit 120 may be defined as a portion disposed on the panel side B, of the outer circumference of the pattern unit.

The pattern unit 120 may have a height "h" of 80 to 170 μm. It is therefore possible to form an inclined surface gradient, which allows the external light to be effectively absorbed and the panel light to be effectively reflected in the relationship with the bottom width P1, and also to prevent the short of the pattern units 120. The height "h" of the pattern unit 120 is defined as the longest length from the bottom of the pattern unit to the top of the pattern unit.

In order to secure the aperture ratio for displaying a display image with an adequate luminance as the panel light is radiated to the viewer side, and to secure an optimal tilt of the inclined surface 120c of the pattern unit for improving the external light shielding effect and the panel light reflection efficiency, the shortest distance P3 between two neighboring pattern units may be set in the range of 40 to 90 μm, and a distance P4 between tops of two neighboring pattern units may be set within a range of 60 to 130 μm. The shortest distance P3 between two neighboring pattern units is substantially the same as the shortest distance between bottoms of two neighboring pattern units.

For the above reasons, when the shortest distance P3 between two neighboring pattern units is 2 to 5 times greater than the bottom width P1 of the pattern unit, the aperture ratio for display can be secured, and the external light shielding effect and the panel light reflection efficiency can be enhanced.

When the height "h" of the pattern unit 120 is 0.89 to 4.25 times greater than the distance between two neighboring pattern units, that is, the shortest distance P3, external light incident from the upper side of the panel with inclination can be prevented from being incident on the panel by maximum. When the height "h" of the pattern unit 120 is formed too high, insulating breakdown of the pattern unit, which may occur, can be prevented, thus optimizing the reflection efficiency of the panel light.

When the distance P4 between tops of two neighboring pattern units is 1 to 3.25 times greater than the shortest distance P3 between bottoms of two neighboring pattern units, the aperture ratio for displaying an image with an adequate luminance can be secured. Furthermore, light emitted from the panel is totally reflected from the inclined surface of the pattern unit and then reaches the viewer side.

Referring to FIG. 5, the inclined surfaces 120c at both sides of the outer circumference of the pattern unit 120 may have a curved shape. At this time, the inclined surfaces of the pattern unit may be bent toward the pattern unit in order for external light, being incident on the pattern unit 120, to be absorbed and shielded by the pattern unit 120.

Referring to FIG. 6, the pattern unit 120 may have a trapezoid. In this case, it is preferred that a top width P2 of the pattern unit 120 be set smaller than a bottom width P1 of the pattern unit 120. The top width P2 of the pattern unit 120 may be set in the range of 5 μm or less. Accordingly, a pattern unit having an inclined surface gradient, which effectively enables the absorption of external light and the reflection of the panel light in the relationship with the bottom width P1 of the pattern unit 120, can be formed.

The pattern unit 120 may be formed asymmetrically right and left. That is, areas depending on the left and right inclined surfaces, of the outer circumference of the pattern unit 120, may be different from each other, or an angle formed by the right inclined surface and the bottom may differ from an angle formed by the left inclined surface and the bottom. The top of the outer circumference of the pattern unit 120 may have a curve having a specific curvature.

Figure 7:
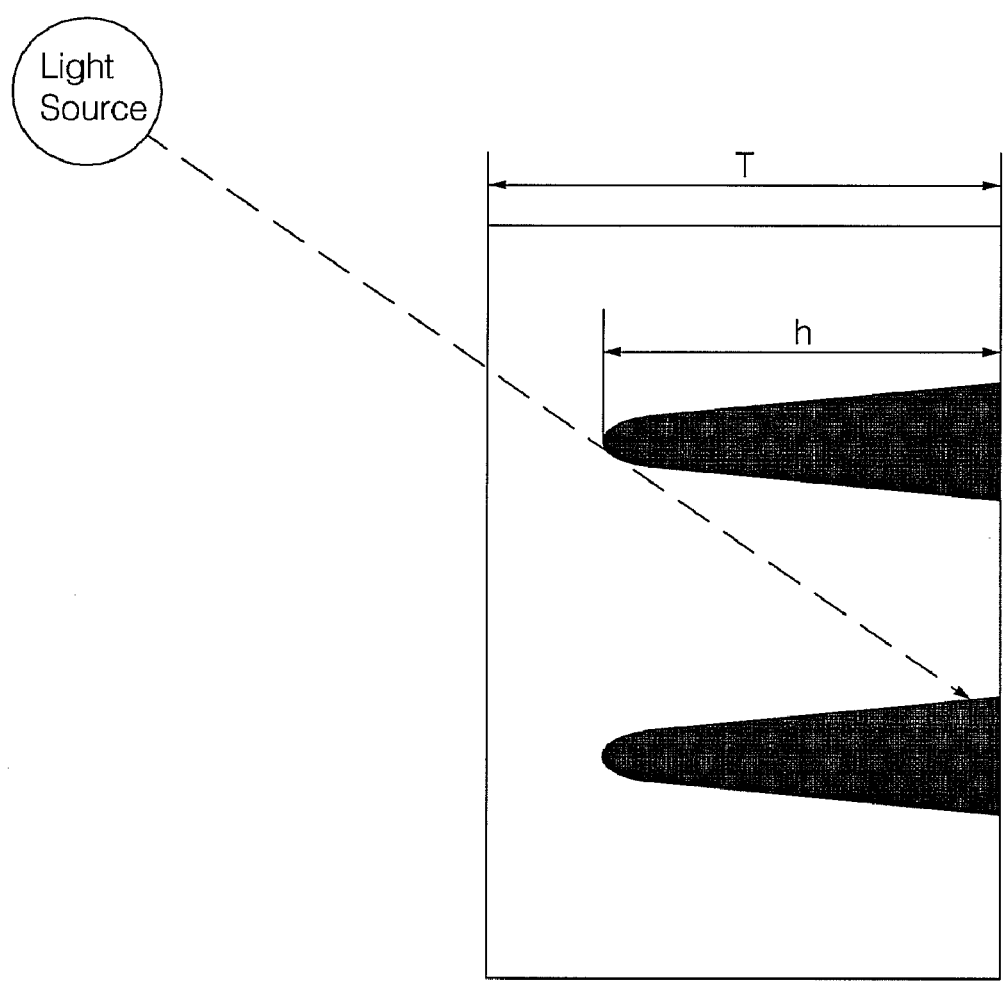
FIG. 7 is a cross-sectional view of the external light shielding sheet for illustrating the relationship between the thickness of the external light shielding sheet and the height of a pattern unit.

FIG. 7 is a cross-sectional view illustrating an embodiment of the structure of the external light shielding sheet according to the present invention in order to describe the thickness of the external light shielding sheet and the height of the pattern unit.

Referring to FIG. 7, in order to secure the roughness of the external light shielding sheet including the pattern units and also to secure the transmittance of a visible ray emitted from the panel so as to display an image, it is preferred that the external light shielding sheet have a thickness T of 100 μm to 180 μm.

When the height "h" of the pattern unit included in the external light shielding sheet is 18 to 35 μm, the fabrication of the pattern units is the most convenient, the external light shielding sheet can have an adequate aperture ratio, and the external light shielding effect and the effect of reflecting light emitted from the panel can be maximized.

The height "h" of the pattern unit may be varied depending on the thickness T of the external light shielding sheet. In general, external light, being incident on the panel to affect lowering in the bright and dark room contrast, is mainly located at a location higher than the panel. Thus, in order to effectively shield external light incident on the panel, it is preferred that the height "h" of the pattern unit have a specific value range with respect to the thickness T of the external light shielding sheet.

As the height "h" of the pattern unit increases as illustrated in FIG. 7, the thickness of the base unit at the top of the pattern unit becomes thin, resulting in insulating breakdown or short. As the height "h" of the pattern unit decreases, external light having an angle range is incident on the panel, thereby hindering the shielding of the external light.

The following Table 1 is an experimental result on insulating breakdown and the external light shielding effect of the external light shielding sheet depending on the thickness T of the external light shielding sheet and the height "h" of the pattern unit.

TABLE 1

| Thicknes (T) of | Height (h) of Pattern | Insulating Breakdown | External Light |
|---|---|---|---|
| 120 μm | 120 μm | ○ | ○ |
| 120 μm | 115 μm | Δ | ○ |
| 120 μm | 110 μm | X | ○ |
| 120 μm | 105 μm | X | ○ |
| 120 μm | 100 μm | X | ○ |
| 120 μm | 95 μm | X | ○ |
| 120 μm | 90 μm | X | ○ |
| 120 μm | 85 μm | X | ○ |
| 120 μm | 80 μm | X | ○ |
| 120 μm | 75 μm | X | Δ |
| 120 μm | 70 μm | X | Δ |
| 120 μm | 65 μm | X | Δ |
| 120 μm | 60 μm | X | Δ |
| 120 μm | 55 μm | X | Δ |
| 120 μm | 50 μm | X | X |

Referring to Table 1, when the thickness T of the external light shielding sheet is 120 μm, if the height "h" of the pattern unit is set to 120 μm or more, the failure rate of a product may increase since there is a danger that the pattern unit may experience insulating breakdown. If the height "h" of the pattern unit is set to 110 μM or less, the failure rate of the external light shielding sheet may decrease since there is no danger that the pattern unit may experience insulating breakdown. However, when the height of the pattern unit is set to 75 μm or less, an efficiency in which external light is shielded by the pattern units may decrease. When the height of the pattern unit is set to 50 μm or less, external light can be incident on the panel.

When the thickness T of the external light shielding sheet is 1.01 to 2.25 times greater than the height "h" of the pattern unit, insulating breakdown at the top portion of the pattern unit can be prevented, and external light can be prevented from being incident on the panel. In order to increase the amount of reflection of light emitted from the panel and to secure a viewing angle while preventing insulating breakdown and external light from being incident on the panel, the thickness T of the external light shielding sheet may be 1.01 to 1.5 times greater than the height "h" of the pattern unit.

The PDP may have a Moire phenomenon due to its lattice structure. The Moire phenomenon refers to patterns of a low frequency, which occur as patterns having a similar lattice shape are overlapped. For example, the Moire phenomenon may refer to wave patterns appearing when mosquito nets are overlapped.

The following Table 2 is an experimental result on whether the Moire phenomenon has occurred, and the external light shielding effect, depending on the ratio of the bottom width P1 of the pattern unit of the external light shielding sheet and the width of the bus electrode formed in the front substrate of the panel. In this case, the width of the bus electrode was 90 μm.

TABLE 2

| Bottom Width of Pattern Unit/Width of Bus Electrode | Moire Phenomenon | External Light Shielding Effect |
|---|---|---|
| 0.10 | Δ | X |
| 0.15 | Δ | X |
| 0.20 | X | Δ |
| 0.25 | X | ○ |
| 0.30 | X | ○ |
| 0.35 | X | ○ |
| 0.40 | X | ○ |
| 0.45 | Δ | ○ |
| 0.50 | Δ | ○ |
| 0.55 | ○ | ○ |
| 0.60 | ○ | ○ |

From Table 2, it can be seen that the bottom width P1 of the pattern unit is 0.2 to 0.5 times greater than the width of the bus electrode, the Moire phenomenon can be reduced, and external light incident on the panel can be decreased. In order to prevent the Moire phenomenon and effectively shield external light while securing the aperture ratio for radiating the panel light, it is preferred that the bottom width P1 of the pattern unit be 0.25 to 0.4 times greater than the width of the bus electrode.

The following Table 3 is an experimental result on whether the Moire phenomenon has occurred and the external light shielding effect depending on the ratio of the bottom width of the pattern unit of the external light shielding sheet and the width of the longitudinal barrier rib formed in the rear substrate of the panel. The width of the longitudinal barrier rib was set to 50 μm.

TABLE 3

| Bottom Width of Pattern Unit/Top Width of Longitudinal Barrier Rib | Moire Phenomenon | External Light Shielding Effect |
|---|---|---|
| 0.10 | ○ | X |
| 0.15 | Δ | X |
| 0.20 | Δ | X |
| 0.25 | Δ | X |
| 0.30 | X | Δ |
| 0.35 | X | Δ |
| 0.40 | X | ○ |
| 0.45 | X | ○ |
| 0.50 | X | ○ |
| 0.55 | X | ○ |
| 0.60 | X | ○ |
| 0.65 | X | ○ |
| 0.70 | Δ | ○ |
| 0.75 | Δ | ○ |
| 0.80 | Δ | ○ |
| 0.85 | ○ | ○ |
| 0.90 | ○ | ○ |

From Table 3, it can be seen that when the bottom width P1 of the pattern unit is 0.3 to 0.8 times greater than the width of the longitudinal barrier rib, the Moire phenomenon can be reduced and external light incident on the panel can be decreased. In order to prevent the Moire phenomenon and also effectively shield external light while securing the aperture ratio for discharging the panel light, it is preferred that the bottom width P1 of the pattern unit be 0.4 to 0.65 times greater than the width of the longitudinal barrier rib.

FIGS. 8 to 11 are cross-sectional views illustrating embodiments of the construction of the filter having a plurality of sheets. The filter formed at the front of the PDP may include an Anti-Reflection (AR)/Near Infrared (NIR) sheet, an Electromagnetic Interference (EMI) shielding sheet, an external light shielding sheet, an optical characteristic sheet, and so on.

Referring to FIGS. 8 to 11, the AR/NIR sheet 210 includes an AR layer 211 disposed at the front of a base sheet 213 made of a transparent plastic material, and a NIR shielding layer 212 disposed at the rear of the base sheet 213. The AR layer 211 serves to prevent externally incident light from reflecting therefrom, thereby decreasing a glairing phenomenon. The NIR shielding layer 212 serves to shield NIR radiated from the panel, so that signals transferred using infrared rays, such as a remote controller, can be transferred normally.

The base sheet 213 may be formed using a variety of materials by taking use conditions or transparency, an insulating property, a heat-resistance property, mechanical strength, etc. into consideration. For example, the materials of the base sheet 213 may include poly polyester-based resin, polyamid-based resin, polyolefin-based resin, vinyl-based resin, acryl-based resin, cellulose-based resin, and so on. In general, it is preferred that the base sheet 213 be formed using a polyester-based material, such as polyethylene terephthalate (PET) and polyethylene naphthalate (PEN) having a good transparency and transmittance of a visible ray of 80% or more. The thickness of the base sheet 213 may be preferably set in the range of 50 to 500 μm considering that it can prevent damage to the sheet by overcoming weak mechanical strength and it can save cost by having an necessary thickness.

The AR layer 211 may generally include an anti-reflection layer. The NIR shielding layer 212 is formed using an NIR absorbent which can be utilized and in which NIR transmittance of a wavelength band of 800 to 1100 μm, emitted from the PDP, is 20% or less, preferably, 10% or less. The NIR absorbent may be formed using materials, such as NIR absorbent pigments having a high optical transmittance of a visible ray region, such as polymethine-base, cyanine-based compound, phthalocyanine-based compound, naphthalocyanine-based compound, buthalocyanine-based compound, anthraquinone-based compound, dithiol-based compound, imonium-based compound, diimmonium-based compound.

The EMI shielding sheet 220 includes an EMI shielding layer 221 disposed at the front of a base sheet 222 made of a transparent plastic material. The EMI shielding layer 221 functions to shield EMI, thereby preventing EMI, radiated from the panel, from being emitting externally. In general, the EMI shielding layer 221 is formed to have a mesh structure using a conductive material. In order to ground the EMI shielding layer, a conductive material is entirely coated on the outside of the pattern, i.e., an invalid region of the EMI shielding sheet 220 on which an image is not displayed. Materials of the metal layer forming the pattern of the EMI shielding sheet may include metal with an enough conductivity to shield electronic waves, such as gold, silver, iron, nickel, chrome and aluminum. The materials may be used as a single material, an alloy or multiple layers.

If a black oxidization process is performed on the bottom of the pattern, the bright and dark room contrast of a panel, such as the black matrix formed within the panel, can be improved. The black oxidization process is performed on at least one side of the outer circumference of the pattern so that it has a color darker than the base unit. In this case, when external light such as sunlight or electrical light is incident on the panel, the blackened portion can prohibit and absorb reflection, thus improving a display image of the PDP with a high contrast. The black oxidization process may include a plating method. In this case, the black oxidization process can be easily performed on all the surfaces of the pattern since adherence force of the plating method is excellent. The plating materials may include one or more compounds selected from copper, cobalt, nickel, zinc, tin and chrome, for example, oxide compounds such as copper oxide, copper dioxide and oxidized steel.

It is preferred that the pattern width of the EMI shielding layer be set in the range of 10 to 30 μm. In this case, a sufficient electrical resistance value for EMI shielding can be obtained, and the aperture ratio for an adequate optical transmittance can be secured.

In general, an external light source exists in a room, outside the room or over the head of a user. The external light shielding sheet 230 is used to represent a black image of the PDP as dark by effectively shielding the external light.

An adhesive 240 is formed between the AR/NIR sheet 210, the EMI shielding sheet 220, and the external light shielding sheet 230, so that each of the sheets and the filter can be firmly adhered at the front of the panel. It is preferred that the base sheets included between the respective sheets be formed using substantially the same material by taking the convenience of fabrication of the filter into consideration.

Figure 8:
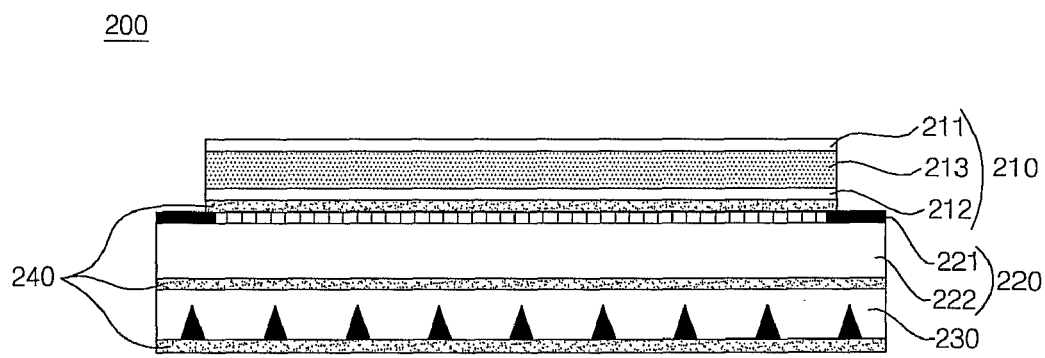
FIGS. 8 to 11 are cross-sectional views illustrating embodiments of the construction of the filter having a plurality of sheets.
Figure 9:
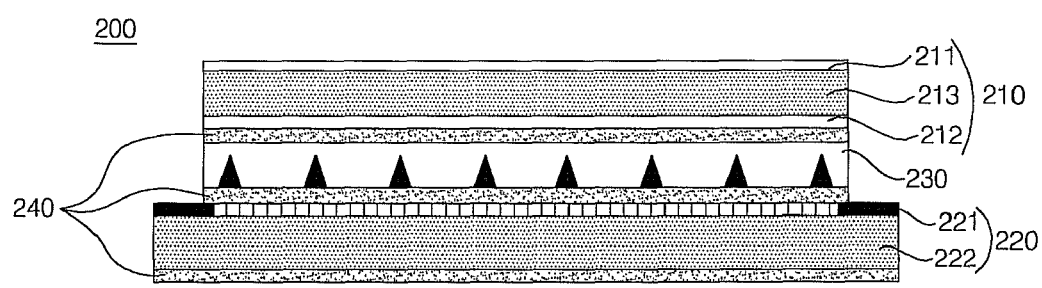

Meanwhile, there is shown in FIG. 8 that the AR/NIR sheet 210, the EMI shielding sheet 220 and the external light shielding sheet 230 are sequentially laminated. However, as illustrated in FIG. 9, the AR/NIR sheet 210, the external light shielding layer 230, and the EMI shielding sheet 220 may be laminated in this sequence. Furthermore, the lamination sequence of the respective sheets may be changed by those skilled in the art. Incidentally, at least one of the sheets may be omitted.

Figure 10:
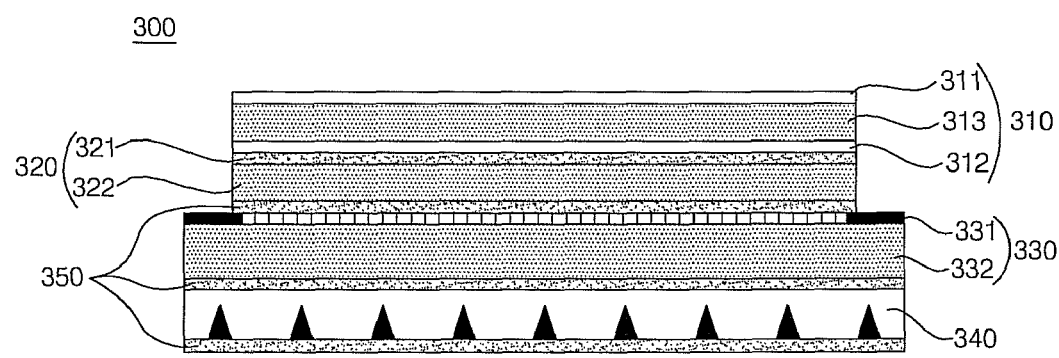
Figure 11:
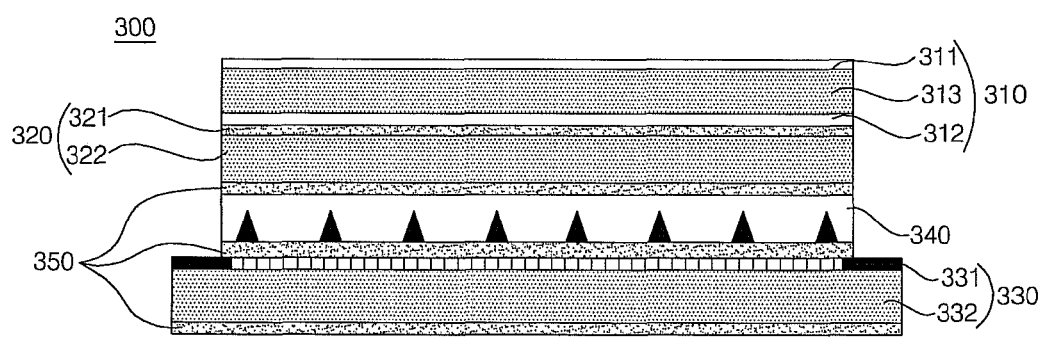

Referring to FIGS. 10 and 11, a filter 300 disposed at the front of a panel may further include an optical characteristic sheet 320 in addition to the AR/NIR sheet 310, the EMI shielding sheet 330 and the external light shielding sheet 340 as illustrated in FIGS. 8 and 9. The optical characteristic sheet 320 functions to improve a color temperature and a luminance characteristic of light incident from the panel and. The optical characteristic sheet 320 includes a base sheet 322 made of a transparent plastic material, and an optical characteristic layer 321 made of dyes and an adhesive and laminated at the front or rear of the base sheet 322.

At least one of the base sheets included each of the sheets illustrated in FIGS. 8 to 11 may be omitted. One of the base sheets may be formed using glass not a plastic material in order to improve the function of protecting the panel. It is preferred that the glass be spaced apart from the panel at a given distance.

Figure 12:
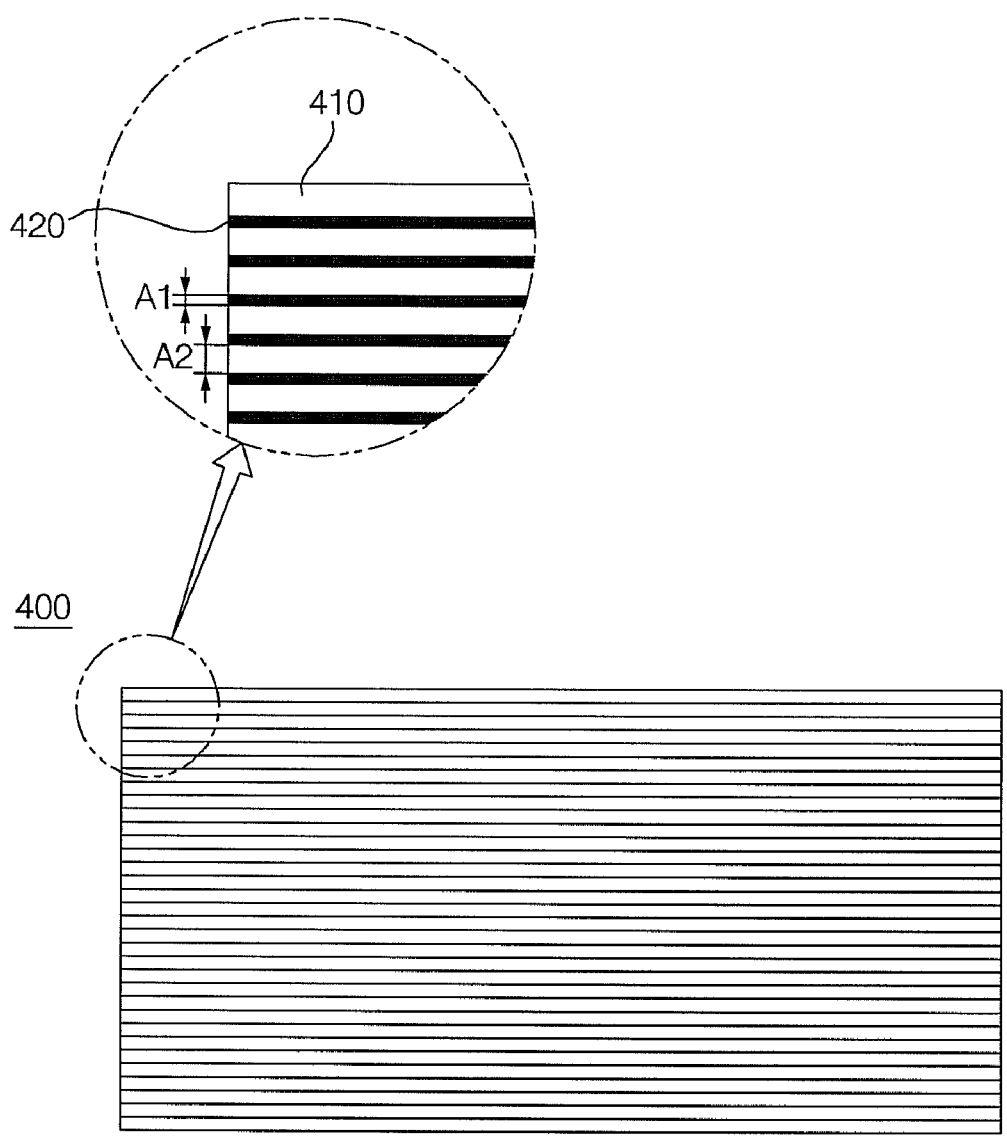
FIGS. 12 and 13 are front views shown to describe the relationship between the external light shielding sheet and an EMI shielding layer according to an embodiment of the present invention.

FIG. 12 is a front view for illustrating the relationship between the external light shielding sheet and an EMI shielding layer according to an embodiment of the present invention.

There is shown in FIG. 12 the front of the external light shielding sheet 400 according to an embodiment of the present invention. Referring to FIG. 12, a plurality of pattern units 420 are formed in a row on a base unit 410 at a specific width A1. In order to secure the transmittance of light emitted from a panel, neighboring pattern units are formed at a specific distance A2.

There is shown in FIG. 12 that the pattern units 420 are substantially parallel to the bottom or top of the external light shielding sheet 400. However, in order to prevent the occurrence of the Moire phenomenon, the pattern units 420 may be disposed at the front of the panel at a specific tilt angle, or may be formed at a specific tilt angle on the basis of the bottom or top of the external light shielding sheet.

Figure 13:
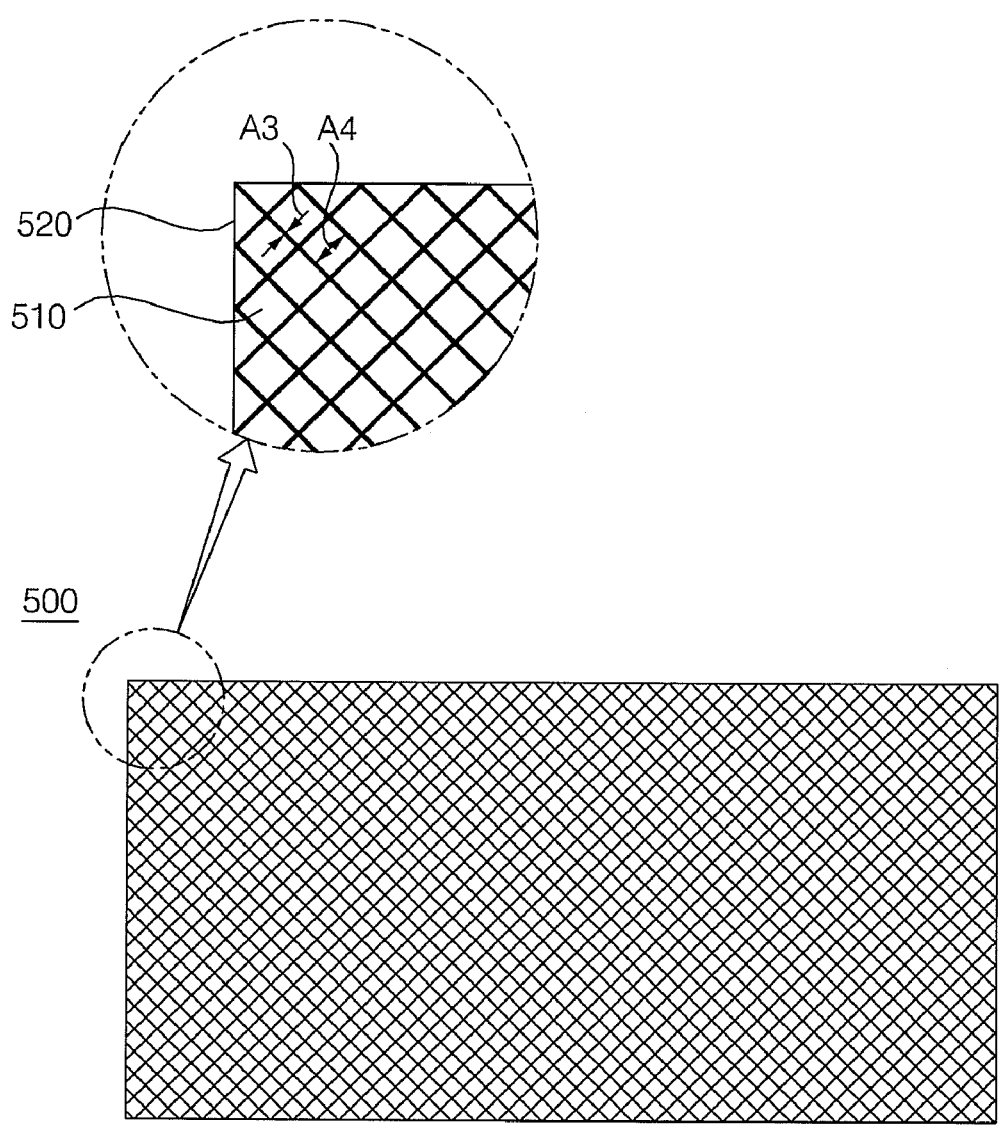

FIG. 13 illustrates the front of an EMI shielding sheet 500. Referring to FIG. 13, the EMI shielding layer 500 preferably includes a plurality of pattern units 520 formed on a base unit 510 in mesh form. The pattern units 520 may be formed using a conductive material having the EMI shielding effect, for example, a material having a low electric resistance such as copper (Cu).

The pattern units 520 of the EMI shielding sheet 500 may have a width A3 of 10 to 30 μm. The shortest distance A4 between neighboring pattern units 520 may be set in the range of 250 to 300 μm. Thus, the aperture ratio with a sufficient optical transmittance can be secured by means of the width A3 of the pattern units 520 that are formed sufficiently small.

In a filter for a PDP to which both the external light shielding sheet 400 and the EMI shielding sheet 500 are applied, the width of the pattern unit of the external light shielding sheet 400 and the width of the pattern unit of the EMI shielding sheet 500 are formed to have a specific ratio in order to secure the aperture ratio of the filter and to accomplish the functionality of each sheet.

In other words, it is preferred that the width A1 of the pattern unit of the external light shielding sheet, which is relatively wide, be 1.2 to 3 times greater than the width A3 of the pattern unit of the EMI shielding sheet. In this case, although the pattern units are overlapped or not overlapped, the functionality of each sheet is not degraded, and an adequate aperture ratio for light emitted from the panel can be secured.

In order to secure an adequate aperture ratio for light emitted from the panel and to facilitate fabrication depending on alignment of the external light shielding sheet and the EMI shielding sheet, the width A1 of the pattern unit of the external light shielding sheet may be 1.5 to 2.3 times greater than the width A3 of the pattern unit of the EMI shielding sheet.

For the above reasons, a width A4 between neighboring pattern units of the EMI shielding sheet 500, which is relatively wide, is preferably 4 to 7 times greater than a distance A2 between neighboring pattern units of the external light shielding sheet 400. Accordingly, although the filter to which the EMI shielding sheet and the external light shielding sheet are applied is disposed at the front of the panel, an aperture ratio, which allows light emitted from the panel to sufficiently reach a viewer, can be secured, EMI can be shielded, and the bright and dark room contrast of the panel can be improved since light incident on the panel from the outside is shielded.

Figure 14:
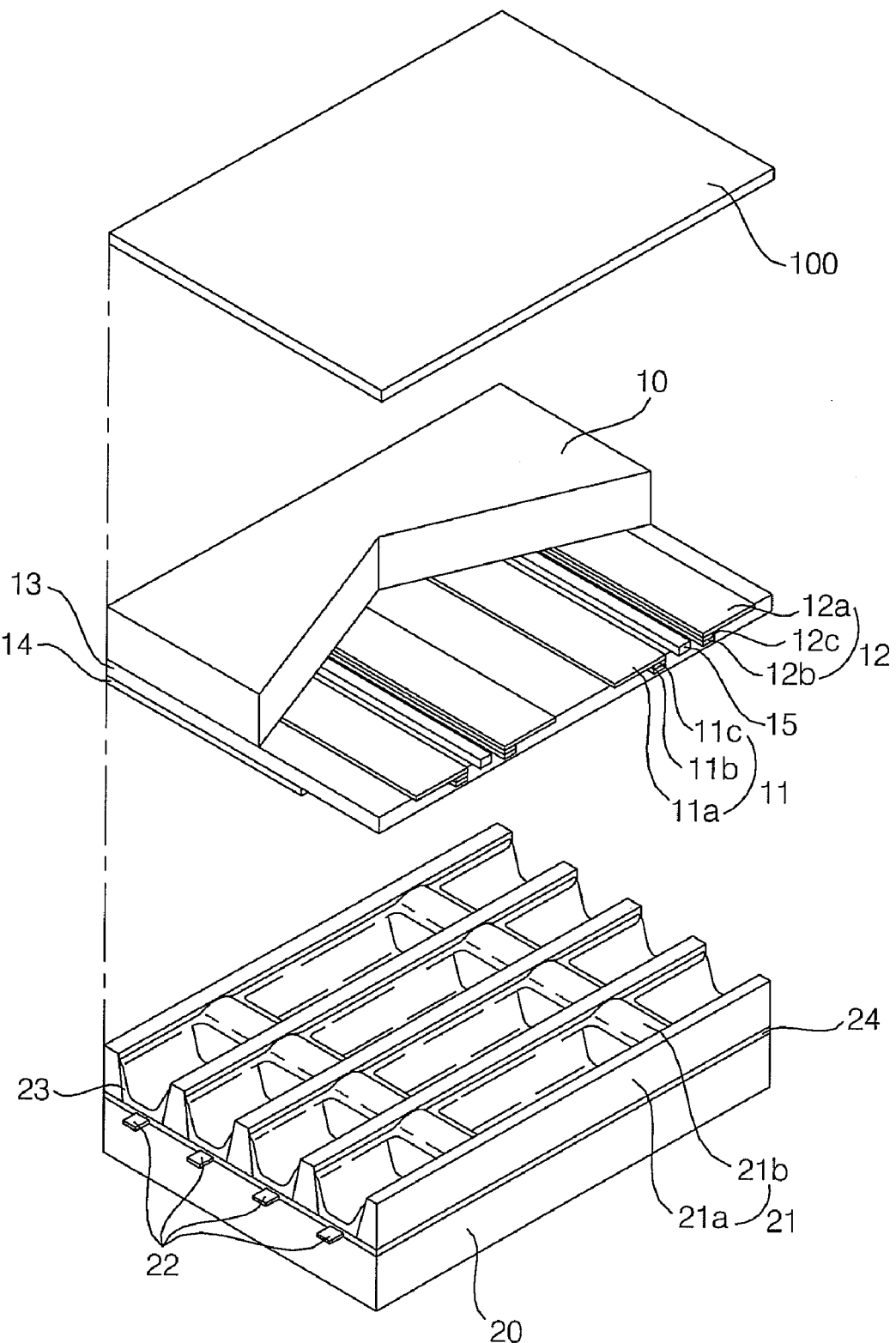
FIG. 14 is a perspective view illustrating the construction of a plasma display apparatus according to an embodiment of the present invention.

Referring to FIG. 14, a filter 100 is preferably disposed at the front of the PDP according to the present invention. The filter 100 may includes an external light shielding sheet, an AR sheet, an NIR shielding sheet, an EMI sheet, and optical characteristic sheet and so on.

An adhesive layer or a cohesive layer may be formed between the filter 100 and the panel. When the adhesive layer or the cohesive layer has a thickness of 10 to 30 μm, light incident from the outside can be effectively shielded, and light generated from the panel can be effectively radiated to the outside. In order to protect the panel from external pressure, etc., the thickness of the adhesive layer or the cohesive layer formed between the filter 100 and the panel may be set in the range of 30 to 120 μm. In order to prevent shock, a film having a function of absorbing shock may be formed between the filter 100 and the panel.

As described above, the plasma display apparatus according to the present invention has been described with reference to the illustrated drawings. However, the present invention is not limited to the embodiments and drawings disclosed in the present specification, but may be applied by those skilled in the art without departing from the scope and spirit of the present invention.

INDUSTRIAL APPLICABILITY

As described above, according to the plasma display apparatus of the present invention, since external light incident on a panel can be shielded, the bright and dark room contrast can be improved. In the prior art, a black matrix, an AR layer attached to a filter, and so on have been used in order to improve the bright and dark room contrast of a PDP. In the present invention, however, external light incident on the interior of a discharge cell of the panel can be blocked effectively. Accordingly, it can be expected that the bright and dark contrast of the panel can be improved significantly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A plasma display apparatus, comprising:
a Plasma Display Panel (PDP);
a first layer including a plurality of light-shielding surfaces; and
a second layer including a plurality of conductors made of at least one metal material, wherein the first and second layers are substantially parallel to a front surface of the PDP, wherein the light-shielding surfaces are spaced from the conductors, and wherein a width of each of the light-shielding surfaces in the first layer is 1.2 to 3.5 times greater than a width of each of the conductors in the second layer.

2. A filter comprising:
a first layer including a plurality of light-shielding surfaces; and a second layer including a plurality of conductors made of at least one metal material, wherein the first and second layers are substantially parallel to a front surface of the PDP, wherein the light-shielding surfaces are spaced from the conductors, and wherein a width of each of the light-shielding surfaces in the first layer is 1.2 to 3.5 times greater than a width of each of the conductors in the second layer.

3. The filter of claim 2, wherein the width of each of the conductors is set in a range of 10 to 30 μm.

4. The filter of claim 2, wherein a shortest distance between neighboring conductors is set in a range of 250 to 300 μm.

5. The filter of claim 2, wherein a bottom of each of the conductors is oxidized based on a black oxidation process.

6. The filter of claim 2, wherein the width of each of the light-shielding surfaces is 1.5 to 2.3 times greater than the width of each of the conductors.

7. The filter of claim 2, wherein a shortest distance between neighboring conductors is 4 to 7 times greater than a shortest distance between neighboring light-shielding surfaces.

8. The filter of claim 2, wherein a thickness of the first layer is 1.01 to 1.5 times greater than a height of each of the light-shielding surfaces.

9. The filter of claim 2, wherein a height of each of the light-shielding surfaces is 0.89 to 4.25 times greater than a shortest distance between a neighboring pair of the light-shielding surfaces.

10. The filter of claim 2, wherein a shortest distance between neighboring light-shielding surfaces is 2 to 5 times greater than a bottom width of one or more of the neighboring light-shielding surfaces.

11. The filter of claim 2, wherein a refractive index of each of the light-shielding surfaces is lower than a refractive index of base coupled to the light-shielding surfaces.

12. The filter of claim 2, further comprising:
a base coupled to the light-shielding surfaces,
wherein a refractive index of each of the light-shielding surfaces is 0.300 to 0.999 times greater than a refractive index of the base.

13. The filter of claim 2, wherein the second pattern unit is formed of a conductive material.

14. The filter of claim 2, wherein a bottom dimension of each of the light-shielding surfaces is set in a range of 18 to 35 μm, said bottom dimension corresponding to a width or length of at least one of a bottom of each of the light-shielding surfaces.

15. The filter of claim 2, wherein a height or each or the light-shielding surfaces is set in a range of 80 to 170 μm.

16. The filter of claim 2, wherein a thickness of the first layer is set in the range of 100 to 180 μm.

17. The filter of claim 2, wherein a shortest distance between neighboring light-shielding surfaces is set in a range of 40 to 90 μm.

18. The filter of claim 2, further comprising at least one of:
an Anti-Reflection (AR) layer configured to prevent reflection of external light;
a Near Infrared (NIR) shielding layer configured to shield NIR radiated from a panel; or
an optical characteristic layer for color tone correction and color tone control.

19. The filter of claim 2, wherein the light-shielding surfaces are spaced projections having one or more sides for absorbing light.

20. The filter of claim 2, wherein the conductors are connected in a mesh pattern.

21. The filter of claim 2, wherein each of the light-shielding surfaces includes a first side disposed at a predetermined acute angle relative to a second side.

22. The filter of claim 2, wherein the light-shielding surfaces are substantially in a same first plane and the conductors are substantially in a same second plane.

23. The filter of claim 22, further comprising:
a buffer layer between the first and second planes.

24. The filter of claim 23, wherein the buffer layer includes an adhesive.

25. The filter of claim 2, wherein the light-shielding surfaces have substantially a same height and a substantially coplanar.

26. The filter of claim 25, wherein the light-shielding surfaces have substantially equal spacing within the first layer.

27. The filter of claim 2, wherein each of the light-shielding surfaces includes at least one inclined side to absorb light traveling at angle relative to the first layer, said angle being different from a 90° angle relative to a top surface of the first layer.

28. A filter comprising: a base layer; and a first layer coupled to the base layer and including a plurality of light-shielding surfaces, wherein the light-shielding surfaces are separated from one another to pass light in a first direction through spaces between respective pairs of the light-shielding surfaces, a second layer substantially parallel to the first layer, wherein each light-shielding surface has one or more slanted sides to absorb light traveling in a second direction, the slanted sides causing each light-shielding surface to have a lower portion wider than an upper portion, and wherein each light-shielding surface has a refractive index lower than a refractive index of the base layer, wherein the second layer includes a plurality of conductors, and wherein a width of each of the light-shielding surfaces in the first layer is 1.2 to 3.5 times greater than a width of each of the conductors in the second layer.

29. The filter of claim 28, wherein the light-shielding surfaces are substantially equally spaced from one another.

30. The filter of claim 28, wherein a first spacing between each neighboring pair of light-shielding surfaces is at least two times greater than a bottom width of at least one of the light-shielding surfaces in said pair.

31. The filter of claim 30, wherein the first spacing extends between bottom edges of the light-shielding surfaces in said pair.

32. The filter of claim 31, wherein a second spacing between each neighboring pair of light-shielding surfaces is greater than the first spacing, the second spacing extending between tops of the light-shielding surfaces in said pair.

33. The filter of claim 28, wherein the first layer is included within the base layer, and wherein a thickness of the base layer is greater than a thickness of the first layer.

34. The filter of claim 33, wherein the thickness of the base layer is 1.01 to 2.25 times greater than a height of one or more of the light-shielding surfaces in the first layer.

35. The filter of claim 28, wherein the first layer is thicker than the second layer.

36. The filter of claim 28, wherein the light-shielding surfaces are substantially in a same first plane and the conductors are substantially in a same second plane.

37. The filter of claim 36, further comprising:
a buffer layer between the first and second planes.

* * * * *